United States Patent
Marquez Duran et al.

(10) Patent No.: US 11,142,058 B2
(45) Date of Patent: Oct. 12, 2021

(54) BATTERY BOX FLOOR FOR ELECTRIC VEHICLES AND CORRESPONDING VEHICLE BODY

(71) Applicant: AUTOTECH ENGINEERING S.L., Vizcaya (ES)

(72) Inventors: Sergio Marquez Duran, Barcelona (ES); Alberto Valera Agea, Barcelona (ES); Carlos Ruiz, Barcelona (ES); Sergio Faría Rodriguez, Barcelona (ES)

(73) Assignee: Autotech Engineering S.L., Vizcaya (ES)

( * ) Notice: Subject to any disclaimer, the term of this patent is extended or adjusted under 35 U.S.C. 154(b) by 79 days.

(21) Appl. No.: 16/633,233

(22) PCT Filed: Jul. 26, 2018

(86) PCT No.: PCT/EP2018/070355
§ 371 (c)(1),
(2) Date: Jan. 23, 2020

(87) PCT Pub. No.: WO2019/020772
PCT Pub. Date: Jan. 31, 2019

(65) Prior Publication Data
US 2020/0180417 A1     Jun. 11, 2020

(30) Foreign Application Priority Data

Jul. 26, 2017   (EP) ..................... 17382495

(51) Int. Cl.
*B60K 1/04* (2019.01)
*H01M 10/625* (2014.01)
(Continued)

(52) U.S. Cl.
CPC ............... *B60K 1/04* (2013.01); *B60K 11/02* (2013.01); *H01M 10/625* (2015.04);
(Continued)

(58) Field of Classification Search
CPC ........... B60K 11/02; B60K 1/04; H01M 10/62
See application file for complete search history.

(56) References Cited

U.S. PATENT DOCUMENTS 7,828,099 B2 * 11/2010 Heckeroth ............... B60K 1/04
180/68.5
8,795,876 B2 *  8/2014 Thomas ................. B60L 50/64
429/159
(Continued)

FOREIGN PATENT DOCUMENTS

| CN | 106025132 A | 10/2016 |
|---|---|---|
| CN | 106450568 A | 2/2017 |

(Continued)

OTHER PUBLICATIONS

International Search Report for International Application No. PCT/EP2018/070355, dated Sep. 19, 2018.
(Continued)

*Primary Examiner* — James A Shriver, II
*Assistant Examiner* — James J Triggs
(74) *Attorney, Agent, or Firm* — Finnegan, Henderson, Farabow, Garrett & Dunner LLP

(57) ABSTRACT

A battery box floor for electric vehicles for being arranged at the lower part of a vehicle body is disclosed. The battery box floor comprises a battery pack supporting panel for supporting a plurality of battery cells, a plurality of lower cooling channels for containing a cooling fluid, a plurality of lower cooling channels being arranged adjacent to and below the battery pack supporting panel such that they can cool the battery cells and an underbody protection arranged below the lower cooling channels. The battery box floor further comprises a deformation inner cavity between said plurality of lower cooling channels and said underbody protection. Additionally, the battery box floor is integrally formed from a metallic material. Also a vehicle body comprising the battery box floor is disclosed.

13 Claims, 3 Drawing Sheets

(51) Int. Cl.
*H01M 10/6556* (2014.01)
*B60K 11/02* (2006.01)
*H01M 50/20* (2021.01)
*B60K 1/00* (2006.01)

(52) U.S. Cl.
CPC ....... *H01M 10/6556* (2015.04); *H01M 50/20* (2021.01); *B60K 2001/005* (2013.01); *B60K 2001/0438* (2013.01); *H01M 2220/20* (2013.01)

(56) References Cited

U.S. PATENT DOCUMENTS

| | | | |
|---|---|---|---|
| 2011/0132580 A1 | 6/2011 | Herrmann et al. | |
| 2012/0164496 A1* | 6/2012 | Lachenmeier | B60L 53/80 |
| | | | 429/61 |
| 2012/0223113 A1* | 9/2012 | Gaisne | H01M 50/20 |
| | | | 224/538 |
| 2012/0263988 A1* | 10/2012 | Obasih | H01M 10/613 |
| | | | 429/98 |
| 2013/0189558 A1 | 7/2013 | Haussmann | |
| 2015/0053493 A1* | 2/2015 | Kees | B60K 1/04 |
| | | | 180/68.5 |
| 2015/0171486 A1 | 6/2015 | Rawlinson | |
| 2015/0318525 A1* | 11/2015 | Maguire | H01M 50/20 |
| | | | 429/96 |
| 2016/0056482 A1* | 2/2016 | Otsuka | H01M 8/04089 |
| | | | 180/220 |
| 2018/0251102 A1* | 9/2018 | Han | H01M 50/20 |

FOREIGN PATENT DOCUMENTS

| | | | |
|---|---|---|---|
| DE | 10 2011 003 535 A1 | 8/2012 | |
| DE | 10 2015 115 643 A1 | 3/2017 | |
| GB | 2541203 A * | 2/2017 | ............ H01M 50/20 |
| GB | 2541203 A | 2/2017 | |

OTHER PUBLICATIONS

Written Opinion of the International Searching Authority for International Application No. PCT/EP2018/070355.

* cited by examiner

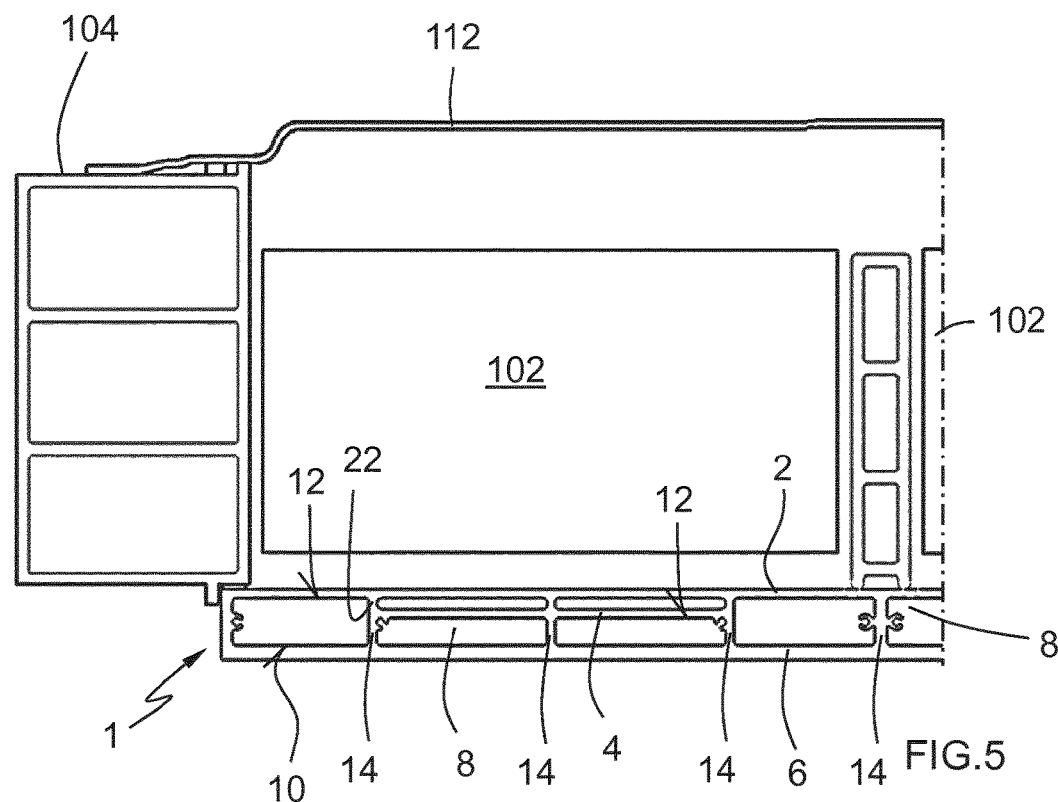
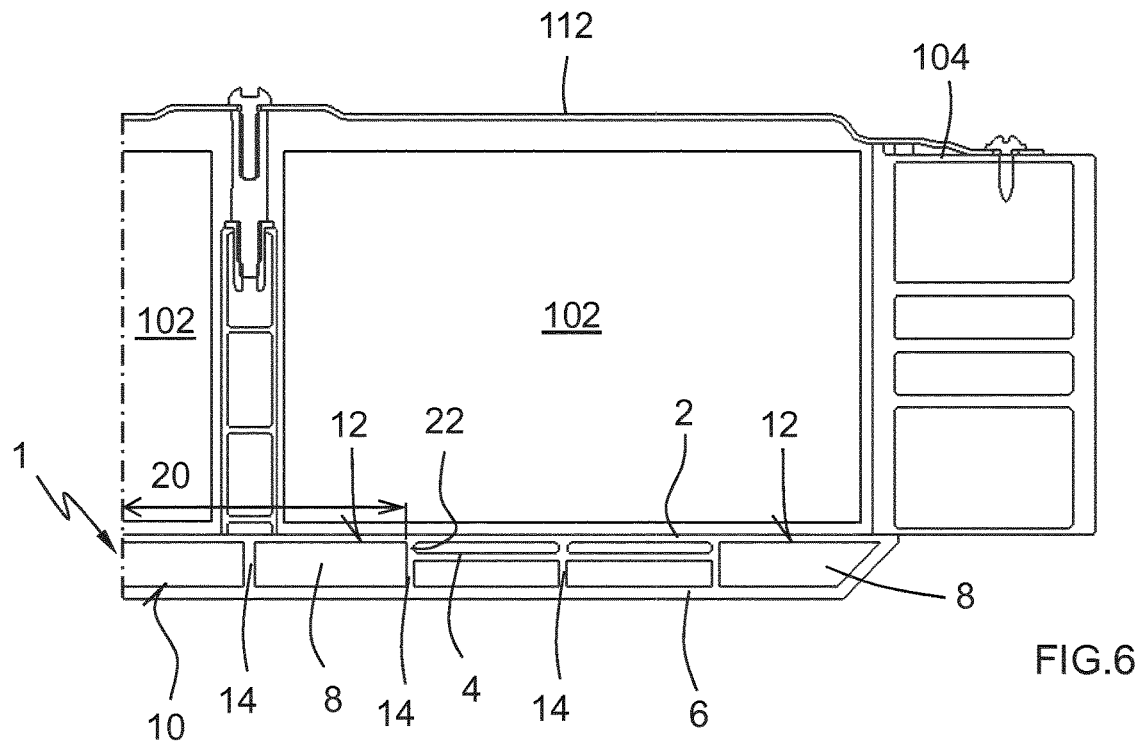

BATTERY BOX FLOOR FOR ELECTRIC VEHICLES AND CORRESPONDING VEHICLE BODY

CROSS-REFERENCE TO RELATED APPLICATIONS

This application is a national stage filing under 35 U.S.C. § 371 of International Application No. PCT/EP2018/070355, filed on Jul. 26, 2018, which claims priority of European Patent Application No. 17382495.4, filed on Jul. 26, 2017. The contents of these applications are each incorporated herein by reference.

Field of the Invention

The invention relates to a battery box floor for electric vehicles for being arranged at the lower part of a vehicle body, said battery box floor comprising: a battery pack supporting panel for supporting a plurality of battery cells, a plurality of lower cooling channels for containing a cooling fluid, said plurality of lower cooling channels being arranged adjacent to and below said battery pack supporting panel such that they can cool said battery cells and an underbody protection arranged below said plurality of lower cooling channels.

The invention relates also to a vehicle body comprising a battery box floor according to the invention.

Definitions

In the present invention the terms "cell", "battery" or "battery cell" can be used interchangeably and refer to any type of battery used as an energy accumulation device for, among others, powering the corresponding motor of an electrical vehicle. This kind of batteries is, e.g. lithium ion batteries, nickel cadmium, nickel hydrogen, or any other type of battery applicable for such purposes.

Also in the present invention the term "electrical vehicle" refers not only to totally electrically driven vehicles but to any vehicle which is at least partially driven by an electrical motor and that incorporates battery cells for powering said electrical motor. Known vehicles of this type are, among others, plug-in electric vehicles, hybrid electric vehicles, fuel cell vehicles or the like, some of which combining both electric and a conventional fuel driven powertrain or the like.

Finally, in the invention, the term "crash" refers to both a collision in which the structure of the vehicle is largely affected due to the vehicle being driven against a big object such as another vehicle, a wall or the like, as well as to impacts against the vehicle due to small objects such as stones, protruding elements or irregularities in the road or the like which lead to damages of the underbody of the vehicle, thus also affecting the battery box floor thereof.

State of the Art

The different crash regulations ensure that there is adequate protection of the critical body regions in case of vehicle collision. In the new electrical vehicles, the so-called battery box floor has become a very important part in the vehicle body. The battery box floor of electrical vehicles is generally arranged at the lower section of the vehicle frame, extending between the vehicle's front and rear axles. This battery box floor is conceived for supporting and housing the battery cells of electrical vehicles. This floor must fulfil several important functions.

One of these important functions is the cooling of the batteries. It is known that the battery cells require a good cooling system in order not only to increase the performance of the battery cells but also to avoid risks that the battery cells overheat and, due to this, an explosion risk arises. Different solutions have been proposed for cooling the batteries. These solutions comprise from air cooled to aluminium cooling channels filled with cooling fluids, in the outside and the inside of the battery compartment. However, the best option to minimize risks is to have the cooling outside the battery box. On the other hand, the drawback of this solution is that the thermal and the crash performances could be at risk. Furthermore, another relevant problem of the cooling of the batteries when it is arranged outside the battery box is that cooling can be very dependent on the environment temperature. Especially in hot areas this could be a serious problem due to a deficient cooling performance of the cooling fluid.

Another key factor in the battery box floor is the underbody protection of the vehicle body before any element impacting from the lower side of the vehicle. Stones, protruding objects or the like may damage the battery box structure. This causes that the battery cells can also be damaged and consequently the risks associated with this damage arise, such as electrolyte leakage, fire and explosion risks of the batteries.

In order to avoid these problems, some technical solutions have been proposed, such as to shield the structure from the damage in the underbody, with reinforcements, covers, and the like.

Document EP 2468609 A2 discloses a solution for cooling the battery cells in the battery box according to which cooling aluminium channels are arranged inside or outside the battery box. These channels are in contact with the battery box floor and dissipate the heat produced by the batteries. However, the assembly and production process of this cooling system is very complex and expensive. On the other hand interior cooling solutions could be a danger in case of leakage. Additionally, the outer cooling in this structure has to be protected from underbody damage in a complicated manner.

Document US 2015/0360550 A1 discloses an underbody unit for reinforcing a motor vehicle body of a motor vehicle of a motor vehicle. The underbody has a floor body that is connectable to the motor vehicle body for dissipating loads of the motor vehicle body. The floor body has an upper side for supporting battery cell units of a traction battery for driving the motor vehicle purely electrically and at least one cooling channel for cooling the upper side. The floor body and the underbody unit form a supporting plate of a battery housing and can support the battery cells of the traction battery, form an armour plating made up of fibre composite material to protect the battery cell arranged adjacent to the floor body. However, this underbody unit is difficult to produce. Furthermore, the cooling of the battery cells is very dependent on the environment conditions. Finally, the armour requires high quality materials in order to provide a good crash performance.

Document US 2007/00877266 A1 discloses a modular battery system comprising a plurality of interlocking cooling fluid ducts arranged over the battery floor to surround the corresponding batteries in order to cool them down. This system is difficult to assemble and it has a very high leakage risk. Furthermore the battery box floor is only a panel and is little reliable in case of impacts received from below. This can lead to damage in the batteries arranged in the battery box.

US 2011/132580 A1, DE 10 2011 003535 A1 and GB 2 541 203 A disclose battery box floors for electric vehicles for being arranged at the lower part of a vehicle body.

SUMMARY OF THE INVENTION

It is an object of the invention to provide a battery box floor for electric vehicles connectable to a vehicle body for reinforcing said vehicle body, providing an improved crash performance, particularly an improved protection of the battery box floor and the batteries arranged therein, and in which the cooling of the batteries can be better regulated independently from the environment conditions. It is another object of the present invention to achieve a battery box floor which is easy to manufacture. These purposes are achieved by a battery box floor of the type indicated at the beginning, characterized in that a deformation inner cavity is provided between said plurality of lower cooling channels and said underbody protection, and in that said battery box floor is integrally formed from a metallic material.

First of all, the deformation inner cavity provides an improved crash performance that avoids the battery box floor and the batteries to be easily damaged. In particular, the inner cavity in case of impact of the vehicle minimizes intrusion of the impacting object in the battery box compartment. This improves significantly the protection of the underbody, thus minimizing the risk of possible damage to the batteries. Also the deformation of inner cavity absorbs the energy from the impact avoiding in many cases that the cooling channels are even deformed or are perforated.

On the other hand, this inner cavity provides also an improved cooling performance. The range of temperatures of an electrical vehicle in use can easily vary, e.g. between 60° C. and −30° C. this, especially in the case of the highest temperatures can lead to cooling problems. Thus, the inner cavity provides an additional isolation of the cooling fluid contained in the cooling channel. Therefore, the temperature of the cooling fluid is much more stable independently from temperature of the environment.

The invention further includes a number of preferred features that are object of the dependent claims and the utility of which will be highlighted hereinafter in the detailed description of an embodiment of the invention.

In a preferred embodiment said metallic material is an aluminium alloy and said battery box floor is made up of at least one extruded part of said aluminium alloy, said extruded part forming said supporting panel, said lower cooling channels, said deformation inner cavity and said underbody protection. Extrusion is a very fast production method. Additionally the aluminium has an excellent thermal conductivity. This provides a good refrigeration of the battery cells via the walls of the cooling channels, adjacent to the battery supporting panel. Indeed, in a preferred embodiment, part of the walls of the cooling channels, adjacent to the batteries, are made from the wall of the supporting panel.

Especially for large vehicles, the battery box floor is made up of a plurality of extruded parts connected to each other via connecting means such as spot welding, arc welding, riveting connecting screws or the like.

However, in a preferred embodiment seeking to reduce the need of assembly steps said battery box floor is extruded in a single part of said aluminium alloy. This is especially applicable to small vehicles.

In a preferred embodiment of the battery box floor of the invention said plurality of lower cooling channels are arranged along the longitudinal moving direction of the vehicle or perpendicularly thereto in order to facilitate the extrusion process. In order to improve the heat removal it is also especially preferable that the lower cooling channels are arranged in the main direction of the battery cells, that is the direction in which de battery cell base is larger when the battery cell is mounted in the vehicle.

In order to solve the problem of regularly distributing the impact efforts across the whole battery box floor, in another embodiment of the invention said deformation inner cavity has a lower inner face and an upper inner face and said battery box floor further comprises a plurality of inner ribs, said plurality of inner ribs extending from said lower inner face to said upper inner face.

In another embodiment of the battery box floor, adjacent to at least one lower cooling channel said battery box floor comprises interrupting sections, and at least one rib of said plurality of inner ribs extends from said lower inner face to said upper inner face at said interrupting sections. These interrupting sections with the corresponding ribs provide for further protection of the cooling channels in case of a crash of any type, that is either against other vehicles or impacts of stones from the lower side. Therefore, the risk of damage and consequent cooling fluid leakage is reduced.

As already mentioned, one of the objects of the invention is to provide an improved crash performance of the battery box floor. To this end, in a preferred embodiment at least one rib of said plurality of inner ribs has an arch shaped cross section. The arch shape of the rib provides an improved rigidity before deformation of the inner cavity.

In the invention, the term "arch shaped" cross section within the comprises different structures such as triangular arches, round arches, segmental arches, lancet arches, elliptical arches, parabolic arches, catenary arches or similar space spanning structures.

Optionally said at least one arch shaped rib is arranged such that the concave side of said at least one arch shaped rib faces said upper inner face of said inner cavity and encapsulates at least one lower cooling channel between two interrupting sections. Again this orientation has proven to provide a very high rigidity with a minimum weight and a very favourable thermic isolation of the cooling fluid contained in the lower cooling channels. Furthermore, the integrity of the lower cooling channel is specially preserved in case of lower impact against the underbody protection.

In an embodiment seeking to maximize the heat transfer between the batteries and the cooling fluid, the lower cooling channels of said plurality of lower cooling channels are fluidly connected to one another to form a cooling circuit and in that the cooling fluid can be circulated within said cooling circuit.

The invention also relates to a vehicle body comprising a battery box floor according to the invention.

In an embodiment of the invention, seeking to further improve the cooling performance on the battery cells, the vehicle body further comprises beams containing beam cooling channels integrated therein for containing said cooling fluid, said beams being arranged adjacent to said battery box floor for cooling the battery cells adjacent to said beams. Said beams can be arranged either lengthwise, as well as crosswise or the beams can even surround the whole outer perimeter of the battery box floor.

In order to more efficiently evacuate the heat removed from the batteries, in a preferred embodiment of the vehicle body, the lower cooling channels of said plurality of lower cooling channels and said beam cooling channels are fluidly connected to one another to form a cooling circuit and in that the cooling fluid can be circulated within said cooling circuit. This facilitates the possibility of refrigerating the cooling fluid by exposing the cooling fluid to the environment air. It is also especially preferable that the beam cooling channels of the beams are arranged perpendicularly to the lower cooling channels, thus connecting the lower cooling channels to one another and simplifying the cooling circuit.

In an embodiment of the vehicle body which seeks to simplify its construction said beams are lower longitudinal side beams arranged at each side of said vehicle body, in the longitudinal moving direction of the vehicle, and in that each of said side beams comprises side beam cooling channels integrated therein for containing said cooling fluid, said side beam cooling channels being arranged relative to said supporting panel for laterally cooling said battery cells adjacent to said side beams.

Also optionally, inner beams extend along the battery pack supporting panel in order to cool every single battery arranged on the battery box floor. Said inner beams can extend both lengthwise as well as crosswise to longitudinal moving direction of the vehicle.

Likewise, the invention also includes other features of detail illustrated in the detailed description of an embodiment of the invention and in the accompanying figures.

BRIEF DESCRIPTION OF THE DRAWINGS

Further advantages and features of the invention will become apparent from the following description, in which, without any limiting character, preferred embodiments of the invention are disclosed, with reference to the accompanying drawings in which:

FIG. 5, is a schematic partial cross sectional view of a third embodiment of a battery box floor according to the invention, assembled with the lower longitudinal side beam of a vehicle body.

FIG. 6, is a schematic partial cross sectional view of a fourth embodiment of the battery box floor according to the invention, assembled with the lower longitudinal side beam of a vehicle body.

DETAILED DESCRIPTION OF EMBODIMENTS OF THE INVENTION

Figure 1:
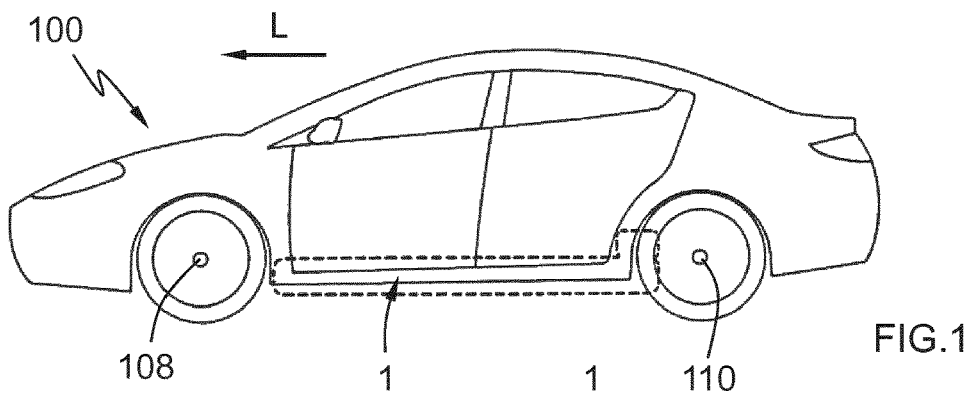
FIG. 1 is a schematic side view of a vehicle in which a battery box floor according to the invention is to be arranged.
Figure 2:
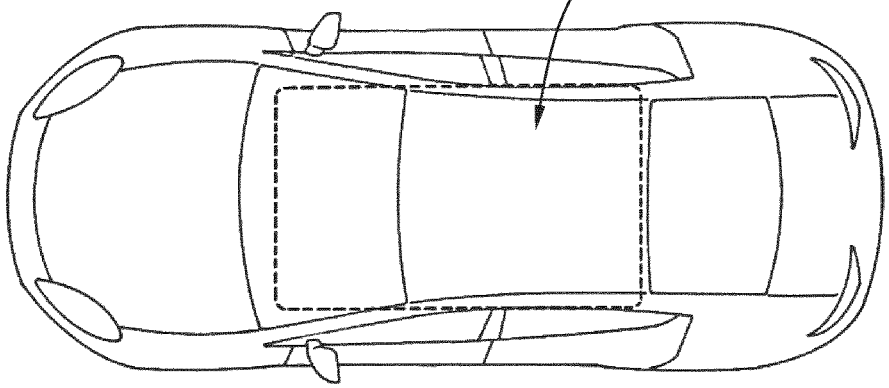
FIG. 2, is a schematic top view of the vehicle of FIG. 1.

FIGS. 1 and 2 show an exemplary electric vehicle in which a battery box floor 1 according to the invention can be applied. More particularly, these figures show a car. However, the battery box floor of the invention can also be applied in other types of electrical vehicles requiring improved crash performance of the battery box floor and better cooling of the batteries.

In particular, FIGS. 1 and 2 show an electric vehicle comprising a front and a rear axles 108, 110.

As already explained before, and as it is apparent from FIGS. 1 and 2 the battery box is a container arranged between the front and rear axles 108, 110 configured to receive and contain the battery cells 102 which power the electric vehicle motors. The main elements that form the battery box are a cover 112, the longitudinal side beams 104 and the battery box floor 1. Optionally, when the battery pack comprises many battery cells 102 arranged side by side, also dividing inner beams 114 are arranged within the battery box. These elements are joined by means of any possible joining technique such as spot welding, laser welding, friction stir welding, riveting, threading of the like.

As far as the crash behaviour of the vehicle body is concerned, one of the most relevant parts of the battery box is the battery box floor 1. As it is apparent from FIGS. 1 and 2 by means of a dotted line, the battery box floor 1 of electric vehicles is arranged at the lower part of the vehicle body 100 for reinforcing the vehicle body 100 and protecting the batteries 102 in case of impact from the side or from below.

Figure 3:
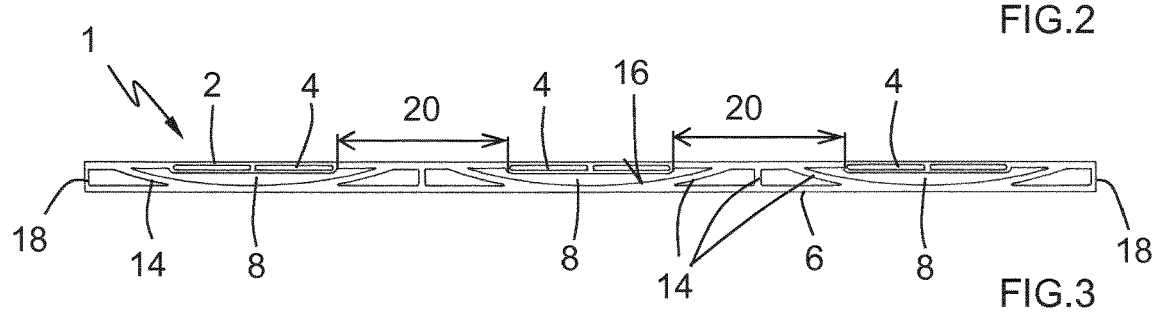
FIG. 3, is a schematic cross section view of a first embodiment of a battery box floor for electric vehicles according to the invention.
Figure 4:
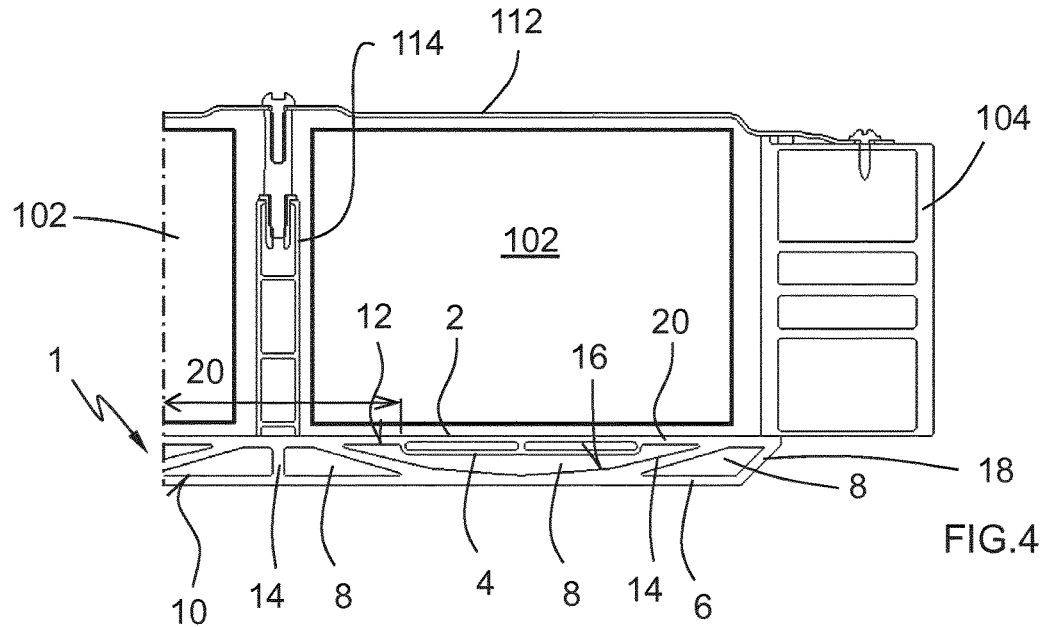
FIG. 4, is a schematic partial cross sectional view of a second embodiment of a battery box including a battery box floor based on the one of FIG. 3, that is, assembled with the lower longitudinal side beam of a vehicle body.

FIGS. 3 and 4 show first and second embodiments of a battery box floor 1 according to the invention which share many features in common. Therefore, they are jointly described herein.

As it is apparent from the figures, the battery box floor 1 comprises three main elements, which are the battery pack supporting panel 2, the lower cooling channels 4 and the underbody protection 6.

The battery pack supporting panel 2 is the upper panel of the battery box floor 1. This is the panel onto which the plurality of battery cells 102 forming the battery pack are supported. For illustrative purposes, in the figures, the battery cells 102 are not shown as being supported on the battery pack supporting panel 12. However, this is to be understood only as a schematic representation. The skilled person understands that the battery cells 102 are physically supported on the upper surface of the battery pack supporting panel 2 and housed within the battery box.

As it is also apparent from these figures, the lower cooling channels 4 for containing a fluid for cooling the battery cells 102 are arranged adjacent to and below the battery pack supporting panel 2. In this preferred embodiment, the upper wall of the cooling channels 4 is also a part of the battery pack supporting panel 2. This improves the heat transfer between the corresponding battery cell 102 and the cooling fluid contained in the lower cooling channels 4.

The cooling channels 4 of these embodiments are arranged along the direction in which the vehicle moves forward. This direction is referred to in the invention as the longitudinal moving direction L. However, in an alternative embodiment, these cooling channels 4 could also be arranged perpendicularly to the longitudinal moving direction L. However, it is especially preferable that the lower cooling channels 4 are arranged along the larger dimension of the battery cell base, once the battery is mounted on the battery pack supporting panel 2.

In FIGS. 3 and 4 is also apparent that the underbody protection 6 is arranged below the lower cooling channels 4 as well as below the battery pack supporting panel 2.

As already mentioned, the invention has the object of improving the crash performance, and especially the performance of the battery box floor 1 according to the invention when receiving any type of impact leading to damages in the batteries, as well as making that the cooling regulation of the battery cells 102 is less influenced by the environment conditions. To this end, a deformation inner cavity 8 is provided between the plurality of lower cooling channels 4 and the underbody protection 6. As it is apparent from the figures, the underbody protection 6 is connected with the battery pack supporting panel 2 by means of two outer walls 18.

Especially in the case of collision from below with any impacting object, this deformation inner cavity 8 provides for impact energy absorption. Therefore, the batteries are protected both from explosion risk, as well as from accidental leakages of cooling fluid or battery fluid.

In the embodiment of FIG. 3, the outer walls 18 are perpendicular to both the battery pack supporting panel 2 and the underbody protection 6. Instead, in the embodiment of FIG. 4, these outer walls 18 form an angle relative to both the battery pack supporting panel 2 and the underbody protection 6. This second embodiment further improves the side crash behaviour in cases were the impact hits directly on these outer walls 18, because thanks to this chamfer like outer walls 18 the intensity of the normal impact force is reduced.

It is also relevant indicating, that in order to simplify the manufacturing process, the battery box floor is integrally formed from a metallic material. The metallic material is an aluminium alloy. Furthermore, the battery box floor is made up of at least one extruded part of said aluminium alloy.

As it is apparent, this extruded part forms the supporting panel 2, the lower cooling channels 4, the deformation inner cavity 8 and the underbody protection 6 in a single part of said aluminium alloy. The aluminium is easy to extrude, but it also has a very notable thermal conductivity, thus improving the heat extraction from the battery cells 102 housed in the cavity box to the cooling fluid.

It is neither essential for the invention that the whole battery box floor 1 is made up of a single part, because alternatively the battery box floor 1 can be made up of a plurality of extruded parts connected to each other via connecting means such as spot welding, laser welding, friction stir welding, riveting, threading or the like. However, each of these extruded parts, form the supporting panel 2, the lower cooling channels 4, the deformation inner cavity 8 and the underbody protection 6. Afterwards these are joined together.

The deformation inner cavity 8 of the battery box floor 1 shown in FIGS. 3 and 4, has a lower inner face 10 and an upper inner face 12. Also in order to improve the stiffness of the battery box floor 1, and consequently to improve the crash behaviour of this element, the battery box floor 1 further comprises a plurality of inner ribs 14 that extend from the lower inner face 10 to the upper inner face 12 of the deformation inner cavity 8.

In these two first embodiments, adjacent to at least one lower cooling channel 4 the battery box floor 1 comprises interrupting sections 20.

Further, as it is apparent from the figures, interrupting sections 20 are sections of the battery box floor in which no lower cooling channel 4 is arranged. Therefore, the upper inner face 12 of the deformation inner cavity 8 is formed by the corresponding lower wall of the lower cooling channels 4 or the lower surface of the battery box supporting panel 2. Thanks to these interrupting sections 20, the ribs 14 extend from the lower inner face 10 to the upper inner face 12 at the interrupting sections 20, further protecting the lower cooling channels 4 in case of a crash.

Furthermore, in order to improve the stiffness of the battery box 1, in these two embodiments the inner ribs 14 have an arch shaped cross section. These arch shaped ribs are arranged such that the corresponding concave side of the arch shaped ribs 14 faces the upper inner face 12 of the inner cavity 8 such that the lower cooling channels 4 are encapsulated between two interrupting sections 20. In this case, the arch shaped ribs form round arch. However other types of arches are possible such as triangular arches, segmental arches, lancet arches, elliptical arches, parabolic arches, catenary arches or the like.

It is especially preferable that the lower cooling channels 4 of the battery box 1 are fluidly connected to one another to form a cooling circuit. The cooling circuit allows for circulation of the cooling fluid within said cooling circuit. To this end, the vehicle is provided with the corresponding pump, fan, control system of the working pressure and all those elements required for a proper function of the cooling circuit and known by the skilled person.

Figure 7:
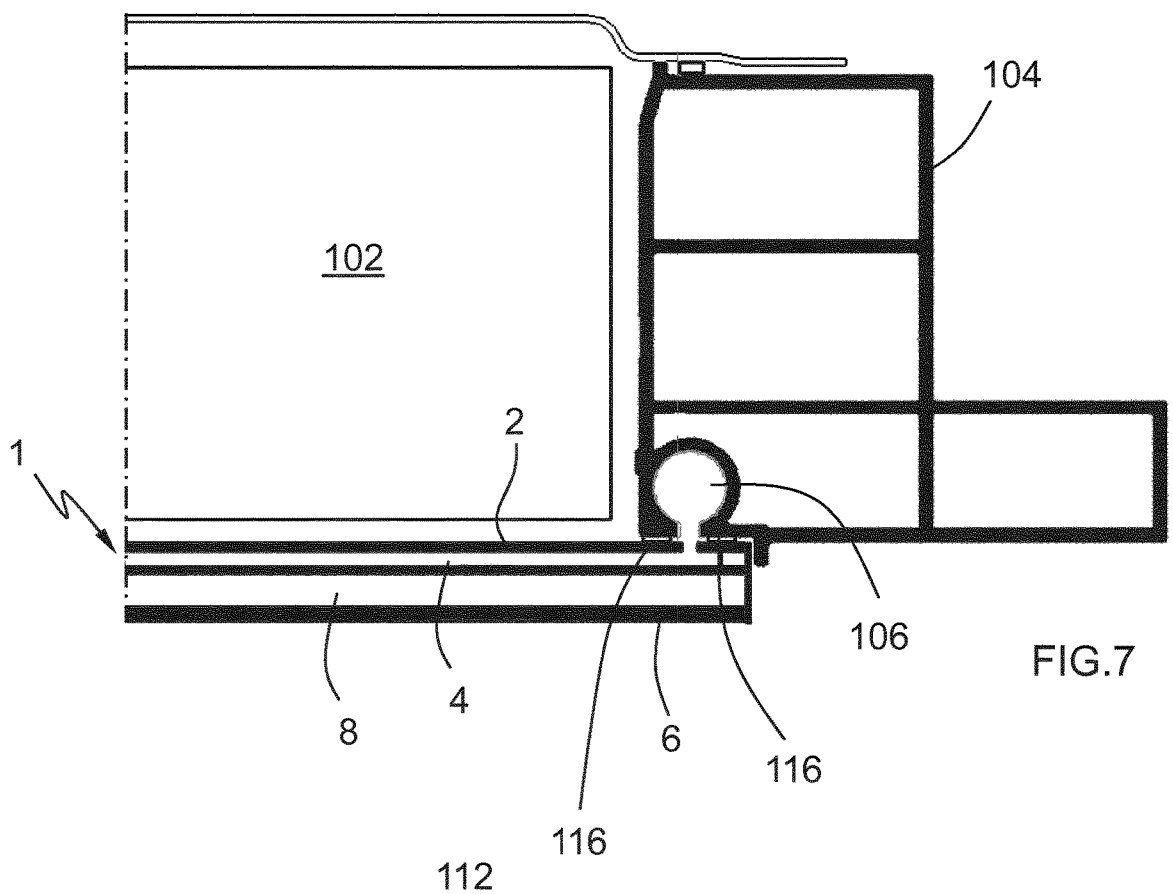
FIG. 7, is a schematic partial cross sectional view of a fifth embodiment of the battery box floor according to the invention, assembled with the lower longitudinal side beam of a vehicle body.

The embodiments shown in FIGS. 5 to 7 share many of the features with the two embodiments described up to this point. Therefore, from now only those features which differ from the previous embodiments are described, while for the description of the rest of the features already described above, reference to the previous paragraphs is made.

FIGS. 5 and 6 show a third and fourth embodiments of the battery box floor 1 according to the invention mounted in a battery box. As it is apparent from these figures now some of the ribs 14 end at the side walls 22 of the lower cooling channels 4, instead of ending at the interrupting sections 20. However, other ribs extend from the lower inner face 10 of the deformation inner cavity 8 to the interrupting sections 20.

Finally, the embodiment of FIG. 7 differs from the previous embodiments in that no inner ribs are provided.

In this case, the vehicle body comprises beams 104 containing beam cooling channels 106 integrated therein for containing cooling fluid. More particularly the vehicle body comprises two lower longitudinal side beams 104 arranged at each side of the vehicle body 100, in the longitudinal moving direction L of the vehicle. For an even further improved cooling performance, each of the side beams 104 comprises side beam cooling channels 106 integrated therein. These side beam cooling channels 106 are arranged relative to the supporting panel 2 facing the battery cells 102. Therefore, it is achieved a lateral cooling effect of the battery cells 102 adjacent to the side beams 104.

In order to achieve a good liquid tightness the connection between the side beam cooling channels 106 and the lower cooling channels 4, the connection of the battery box floor 1 and the side beams 104 is provided with a sealing element 116. It is especially preferable that the lower cooling channels and the side beam cooling channels 106 are fluidly connected forming a cooling circuit. It is especially preferable that the beam cooling channels 106 are arranged perpendicularly to the lower cooling channels 4.

Figure 8:
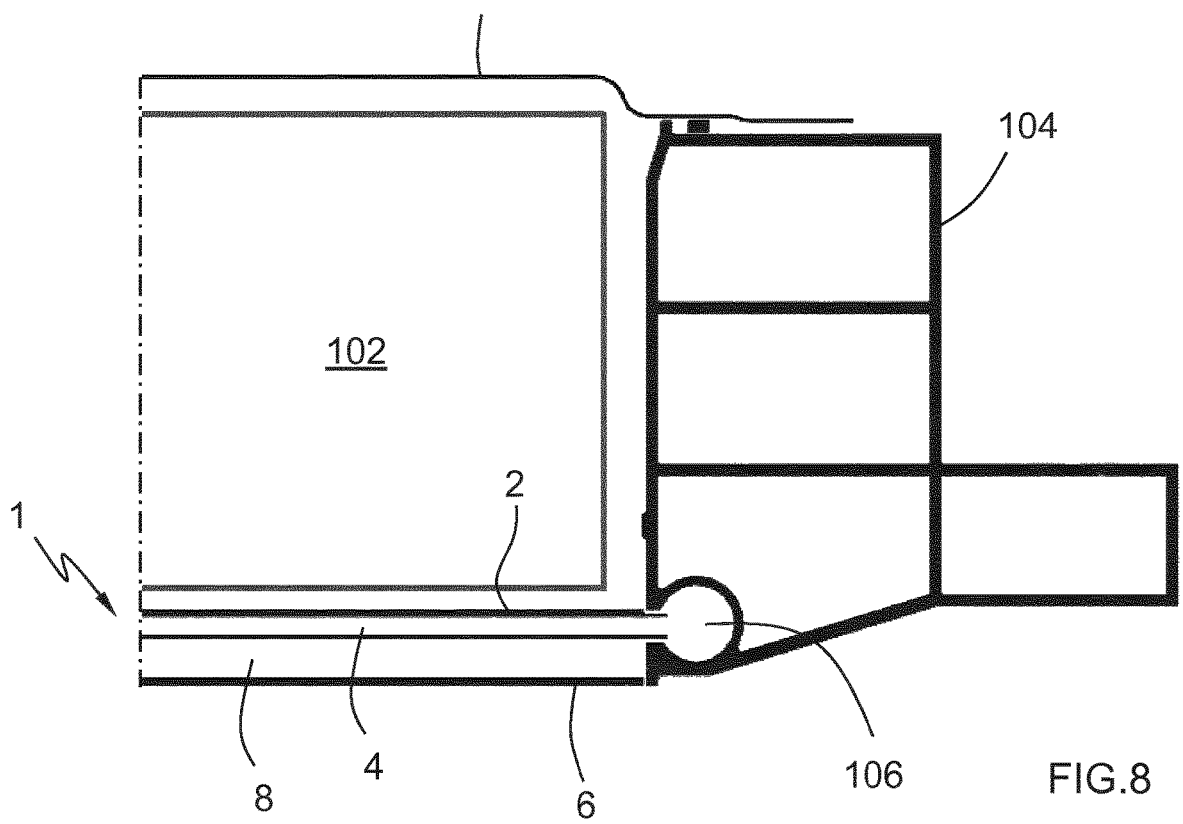
FIG. 8, is a schematic partial cross sectional view of a sixth embodiment of the battery box floor according to the invention, assembled with the lower longitudinal side beam of a vehicle body.

Finally, FIG. 8 shows a sixth embodiment of the battery box floor 1 of the invention. In this case, differently to the embodiment of FIG. 7, the side beam cooling channel 106 is centred with the lower cooling channel 4 for making the circulation of cooling fluid much easier.

As it is apparent for the skilled person, the features of the different embodiments described herein can also be combined in several different ways.

The invention claimed is:

1. A battery box floor for electric vehicles comprising:
   a battery pack supporting panel for supporting a plurality of battery cells;
   a plurality of lower cooling channels for containing a cooling fluid, said plurality of lower cooling channels being arranged adjacent to and below said battery pack supporting panel such that they can cool said battery cells; and
   an underbody protection arranged below said plurality of lower cooling channels, wherein:
   a deformation inner cavity is provided between said plurality of lower cooling channels and said underbody protection,
   said battery box floor is integrally formed from a metallic material,
   said metallic material is an aluminium alloy, and
   said battery box floor is made up of at least one extruded part of said aluminium alloy, said extruded part forming said supporting panel, said lower cooling channels, said deformation inner cavity, and said underbody protection.

2. The battery box floor according to claim 1, wherein the battery box floor is extruded in a single part of said aluminium alloy.

3. The battery box floor according to claim 1, wherein said battery box floor is made up of a plurality of extruded parts connected to each other via connecting means.

4. The battery box floor according to claim 1 wherein:
   said deformation inner cavity has a lower inner face and an upper inner face, and
   said battery box floor further comprises a plurality of inner ribs, said plurality of inner ribs extending from said lower inner face to said upper inner face.

5. The battery box floor according to claim 4, wherein:
   adjacent to at least one lower cooling channel said battery box floor comprises interrupting sections, and
   at least one rib of said plurality of inner ribs extends from said lower inner face to said upper inner face at said interrupting sections.

6. The battery box floor according to claim 4, wherein at least one rib of said plurality of inner ribs has an arch shaped cross section.

7. The battery box floor according to claim 1, wherein at least one arch shaped rib is arranged such that the concave side of said at least one arch shaped rib faces said upper inner face of said inner cavity and encapsulates at least one lower cooling channel between two interrupting sections.

8. The battery box floor according to claim 1, wherein the lower cooling channels of said plurality of lower cooling channels are fluidly connected to one another to form a cooling circuit and in that the cooling fluid can be circulated within said cooling circuit.

9. A vehicle body, comprising:
   a battery box floor, wherein the batter box floor comprises:
      a battery pack supporting panel for supporting a plurality of battery cells;
      a plurality of lower cooling channels for containing a cooling fluid, said plurality of lower cooling channels being arranged adjacent to and below said battery pack supporting panel such that they can cool said battery cells; and
      an underbody protection arranged below said plurality of lower cooling channels, wherein:
      a deformation inner cavity is provided between said plurality of lower cooling channels and said underbody protection,
      said battery box floor is integrally formed from a metallic material,
      said metallic material is an aluminium alloy, and
      said battery box floor is made up of at least one extruded part of said aluminium alloy, said extruded part forming said supporting panel, said lower cooling channels, said deformation inner cavity, and said underbody protection.

10. The vehicle body according to claim 9, further comprising beams containing beam cooling channels integrated therein for containing said cooling fluid, said beams being arranged adjacent to said battery box floor for cooling the battery cells adjacent to said beams.

11. The vehicle body according to claim 10, wherein the lower cooling channels of said plurality of lower cooling channels and said beam cooling channels are fluidly connected to one another to form a cooling circuit and in that the cooling fluid can be circulated within said cooling circuit.

12. The vehicle body according to claim 10, wherein:
   said beams are lower longitudinal side beams arranged at each side of said vehicle body, in the longitudinal moving direction of the vehicle, and
   each of said side beams comprises side beam cooling channels integrated therein for containing said cooling fluid, said side beam cooling channels being arranged relative to said supporting panel for laterally cooling said battery cells adjacent to said side beams.

13. The vehicle according to claim 9, wherein said plurality of lower cooling channels are arranged along a longitudinal moving direction of the vehicle or perpendicularly thereto.

* * * * *